(12) United States Patent
Hutton et al.

(10) Patent No.: US 7,120,959 B2
(45) Date of Patent: Oct. 17, 2006

(54) AUTOMATED ELEVATIONAL ADJUSTMENT OF PASSENGER LOADING BRIDGE

(75) Inventors: Neil Hutton, Ottawa (CA); Rami Ibrahim, Kanata (CA); Mathew Connelly, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/957,981

(22) Filed: Oct. 5, 2004

(65) Prior Publication Data

US 2006/0070193 A1  Apr. 6, 2006

(51) Int. Cl.
*E01D 15/10* (2006.01)

(52) U.S. Cl. ................... 14/71.5; 244/137.2
(58) Field of Classification Search ........ 14/69.5–72.5; 244/137.2
See application file for complete search history.

(56) References Cited

U.S. PATENT DOCUMENTS

| | | | | |
|---|---|---|---|---|
| 3,683,440 A | * | 8/1972 | Xenakis et al. ............... 14/71.5 |
| 5,105,495 A | * | 4/1992 | Larson et al. ................. 14/71.5 |
| 5,226,204 A | | 7/1993 | Schoenberger et al. |
| 5,734,736 A | | 3/1998 | Palmer et al. |
| 6,324,489 B1 | | 11/2001 | Millgard |
| 6,496,996 B1 | * | 12/2002 | Worpenberg et al. ........ 14/71.5 |
| 6,552,327 B1 | | 4/2003 | Anderberg |
| 6,684,443 B1 | * | 2/2004 | Thomas et al. ............... 14/71.5 |
| 6,724,314 B1 | * | 4/2004 | Hutton .................... 340/686.1 |
| 2003/0136898 A1 | | 7/2003 | Oki et al. |

FOREIGN PATENT DOCUMENTS

WO   WO 03/072435   9/2003

\* cited by examiner

*Primary Examiner*—Raymond Addie
(74) *Attorney, Agent, or Firm*—Freedman & Associates

(57) ABSTRACT

Vertical alignment of a movable bridge with a doorway of an aircraft is achieved by moving a sensor disposed on the movable bridge in a generally downward direction so as to sense a position of an upper surface of the aircraft. The upper surface of the aircraft has a known elevational relationship relative to the doorway of the aircraft, which is used along with the sensed position to align an aircraft engaging portion of the movable bridge with the doorway. The method accommodates different heights of a same model of aircraft resulting from differences in the aircraft loads and is easily implemented using non-contact sensors.

26 Claims, 8 Drawing Sheets

AUTOMATED ELEVATIONAL ADJUSTMENT OF PASSENGER LOADING BRIDGE

FIELD OF THE INVENTION

The present invention relates generally to automated passenger loading bridges and in particular to elevational adjustment of an automated passenger loading bridge.

BACKGROUND OF THE INVENTION

Passenger loading bridges are used to quickly transport passengers between an airport terminal and an aircraft and to protect the passengers from weather and other environmental influences. For example, a present day passenger loading bridge comprises a plurality of adjustable modules, including: a rotunda, a telescopic tunnel, a bubble section, a cab, and elevating columns with wheel carriage. Of concern to airlines is to ensure that a passenger loading bridge is aligned with an aircraft as rapidly as possible, thereby minimizing the time to complete passenger deplaning as well as the total time the aircraft spends at the airport terminal. As such, manual, semi-automated and fully-automated bridge alignment systems are known for adjusting the passenger loading bridge relative to the aircraft. Some passenger loading bridges are equipped with controls, which automatically cause the height adjustment mechanism of the passenger loading bridge to move the cab to a predetermined height depending on the aircraft model. However, a major problem is that once the cab of the passenger loading bridge is almost aligned with the door of the aircraft using an automated process, a bridge-operator still has to manually perform the final height adjustment. The reason is because one can retrieve data from memory relating the height of the doorsill to other features of the aircraft, but depending upon the load of the aircraft the height of the doorsill above ground varies substantially.

Schoenberger et al. in U.S. Pat. No. 5,226,204 describe an automated passenger loading bridge using video cameras to control bridge movement. The system maneuvers the cab of the bridge to a position close to the door of the aircraft, whereupon a bridge-operator controls the bridge movement by looking at images recorded by the video cameras. Suggestions are made in the patent specification that the system could be arranged to operate fully automated using image processing of the recorded video images to calculate the relative position of the passenger loading bridge with respect to the aircraft. However, image processing is time consuming, thus making the bridge movement based thereon slow.

U.S. Pat. No. 6,552,327 in the name of Anderberg, issued Apr. 22, 2003 teaches a device for positioning a passenger loading bridge for controlling at least the vertical movement of the bridge. The device comprises a sensor arranged to transmit electromagnetic radiation in different directions and to detect electromagnetic radiation. The device measures a time difference between the transmission of radiation in at least two different directions and the detection of said radiation for determining the position of the passenger loading bridge in relation to the aircraft. A major disadvantage of Anderberg's device is the need for highly complex sensor and signal processing systems, since accuracy of the positioning depends on the sensing and processing of very small time differences, in particular in situations of final vertical adjustments when the distance between the passenger loading bridge and the aircraft is relatively small.

PCT application WO 03/072435 in the name of Spencer et al., published Sep. 04, 2003 teaches an imaging system for a passenger loading bridge for docking automatically with an aircraft. Light is emitted toward reflective targets mounted to the aircraft. Using a digital camera the reflective light is sensed to provide image data of the targets. The image data are then processed to reveal information for bridge adjustment.

U.S. Patent Application 20030136898 in the name of Oki et al., published Jul. 24, 2003 teaches automatic control of a passenger loading bridge. Light is emitted towards reflective targets mounted to the aircraft. Using sensors the reflected light is sensed and based on the pattern of the sensed light the passenger loading bridge is adjusted.

The employment of reflective targets mounted to the aircraft has numerous disadvantages. Firstly, it is only possible to automatically adjust the passenger loading bridge for those aircraft having reflective targets mounted thereto. Secondly, reliable operation of the automatic adjustment is not always ensured, for example, foreign material that is disposed on the reflective targets, separation of the reflective targets from the aircraft, or adverse weather conditions can substantially impede the performance of this system, or even render it completely inoperative. Furthermore, there also exists the danger that reflective surfaces of ground service equipment or other ramp equipment may inadvertently be mistaken for an aircraft.

It would be advantageous to provide automated elevational adjustment of a passenger loading bridge that is accurate and fast in response for final height adjustment. It would be further advantageous to provide automated elevational adjustment of a passenger loading bridge that is simple, reliable, and does not require modifications of the aircraft serviced by the passenger loading bridge.

SUMMARY OF THE INVENTION

It is, therefore, an object of at least some embodiments of the instant invention to provide a method and apparatus for automated elevational adjustment of a passenger loading bridge that is accurate and fast in response for final height adjustment.

It is further an object of at least some embodiments of the instant invention to provide a method and apparatus for automated elevational adjustment of a passenger loading bridge that is simple and reliable.

It is further an object of at least some embodiments of the instant invention to provide a method and apparatus for automated elevational adjustment of a passenger loading bridge that does not require modifications of the aircraft serviced by the passenger loading bridge.

In accordance with an aspect of the instant invention there is provided a method for elevationally aligning a movable bridge with a doorway of an aircraft, comprising: providing a sensor disposed on the movable bridge; using the sensor, launching electromagnetic radiation along a first optical path and in a direction toward the aircraft; sensing a first intensity of the electromagnetic radiation being reflected from a known surface of the aircraft along the first optical path; adjusting the sensor so as to emit electromagnetic radiation along other optical paths that are increasingly spaced apart from the first optical path, until the sensed intensity of electromagnetic radiation being reflected from the known surface of the aircraft along one of the other optical paths changes by a predetermined amount that is indicative of the sensor sensing an elevational limit of the known surface of the aircraft; and, adjusting an elevational position of an aircraft engaging portion of the movable bridge based upon the indicated elevational limit of the known surface of the aircraft and based upon a known elevational relationship between the elevational limit of the known surface of the aircraft and the doorway of the aircraft.

In accordance with another aspect of the instant invention there is provided a method for elevationally aligning a movable bridge with a doorway of an aircraft, comprising: providing a sensor disposed on the movable bridge for sensing a position of an upper surface of the aircraft, the upper surface of the aircraft having a known elevational relationship relative to the doorway of the aircraft; aligning an aircraft engaging portion of the movable bridge with the doorway of the aircraft in a direction along the length of the aircraft and such that the sensor is disposed elevationally above the upper surface of the aircraft; moving the sensor in a generally downward direction; and, sensing an indication that the sensor is approximately at a same elevational position as the upper surface of the aircraft.

In accordance with yet another aspect of the instant invention there is provided a method for elevationally aligning a movable bridge with a doorway of an aircraft, comprising: using a sensor, sensing a property relating to each one of a plurality of different elevational locations within a vertical plane that is normal to a length of the aircraft, the vertical plane passing through the doorway of the aircraft to which the moveable bridge is to be elevationally aligned, and at least some of the plurality of different elevational locations being disposed outside a known surface boundary of the aircraft; and, detecting a variation in the sensed property between two elevational locations of the plurality of different elevational locations, the variation being indicative of an elevational position of the known surface boundary of the aircraft.

In accordance with yet another aspect of the instant invention there is provided an apparatus for elevationally aligning a movable bridge with a doorway of an aircraft, comprising: a sensor for sensing an elevational limit of a known surface of the aircraft, the sensor being disposed at a known position relative to an aircraft engaging portion of the movable bridge; a processor in communication with the sensor for receiving a signal therefrom, the signal containing information relating to a position of the sensed elevational limit of the known surface of the aircraft, the processor for determining an elevational adjustment of the aircraft engaging portion of the movable bridge based upon the signal and based upon data indicative of a known elevational difference between the elevational limit of the known surface of the aircraft and a door sill of the doorway, and the processor for providing a control signal relating to the determined elevational adjustment to a controller of a vertical alignment mechanism of the movable bridge.

In accordance with yet another aspect of the instant invention there is provided an apparatus for elevationally aligning a movable bridge with a doorway of an aircraft, comprising: a sensor for sensing an elevational limit of a known surface of the aircraft and for providing a control signal when the elevational limit is sensed, the sensor being disposed at a known position relative to an aircraft engaging portion of the movable bridge; and, a programmable limit switch in communication with the sensor for stopping a movement of the movable bridge in dependence upon receiving the control signal from the sensor, wherein the position of the sensor is selected such that the aircraft engaging portion of the movable bridge is elevationally aligned with the doorway of the aircraft when the sensor senses the elevational limit of the known surface of the aircraft.

BRIEF DESCRIPTION OF THE DRAWINGS

Exemplary embodiments of the instant invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined therein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1A:
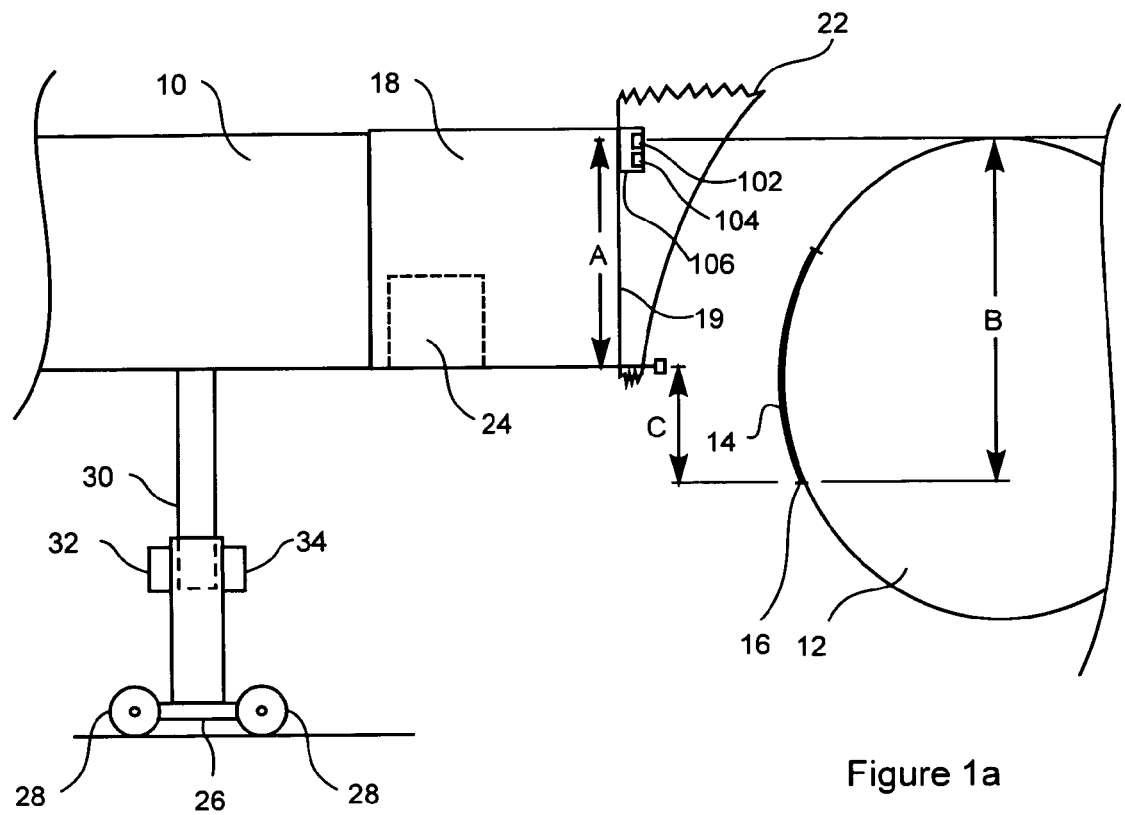
FIG. 1a illustrates a schematic side view of a passenger loading bridge for an aircraft, the bridge being equipped with a system according to the instant invention.
Figure 1B:
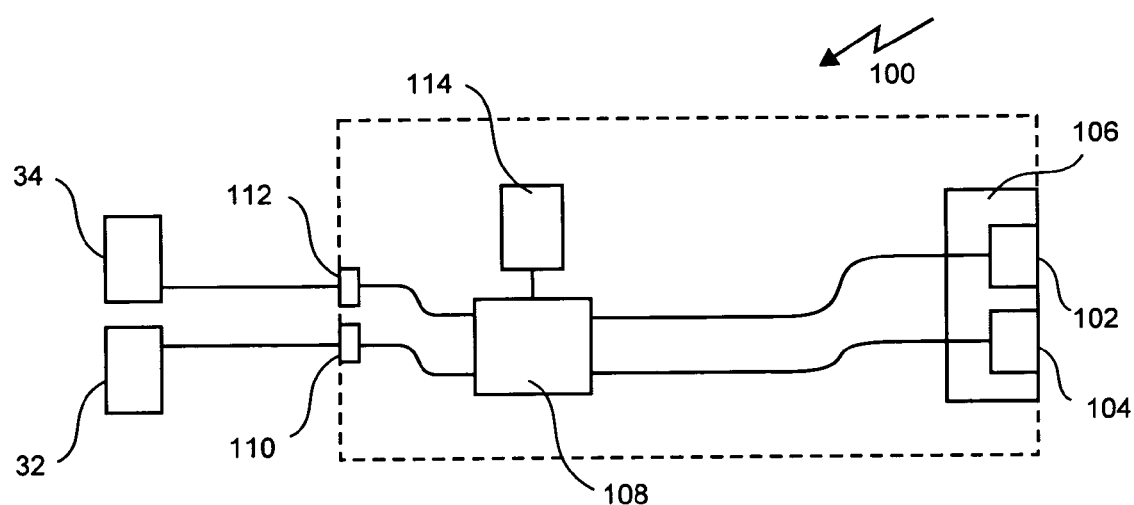
FIG. 1b is a simplified block diagram schematically illustrating the system according to the instant invention.

Referring to FIG. 1a, a schematic side view of a passenger loading bridge 10 is shown. The passenger loading bridge 10, which is identically referred to as a moveable bridge, is equipped with a system 100 for automated elevational adjustment, as is shown in detail in FIG. 1b. Also shown in FIG. 1a is an aircraft 12 with a door 14 having a doorsill 16, to which the passenger loading bridge is to be connected. The passenger loading bridge ends with an aircraft engaging portion, such as for instance a pivotable cabin 18 having a floor member 20 and canopy 22. A control unit 24 is disposed within the cabin to be used by a bridge-operator when it is necessary to adjust the passenger loading bridge 10 manually. The passenger loading bridge 10 includes a bogie 26 with drive wheels 28 for achieving angular displacement as well as for altering the length of the passenger loading bridge, and a vertically adjustable support mechanism 30 for adjusting the height of the passenger loading bridge 10. The support mechanism 30 is equipped with a transducer 32 to determine the height of the floor member 20. Alternatively, another known system is provided for determining the height of the floor member 20.

The system 100 for automated elevational adjustment according to the instant invention includes a transmitter 102 for providing a beam of electromagnetic radiation. For instance, the transmitter 102 includes a laser or LED, as two non-limiting examples. The transmitter 102 is mounted to the cabin 18 at aircraft facing wall 19, preferably at ceiling height such that the beam of electromagnetic radiation emitted therefrom is oriented substantially horizontally. Radiation reflected from the aircraft is sensed using detector 104, for example, a photo detector sensitive for a substantially same wavelength as the electromagnetic radiation, also mounted to the wall 19. For example, the detector is placed below the transmitter such that radiation that is reflected from an object located behind the aircraft 12 is substantially blocked by the same. The transmitter, including at least one transmitter element, and the detector, including at least one detector element, is referred to collectively as the sensor. Preferably, the transmitter 102 and the detector 104 are disposed within a same housing 106 and mounted to the wall 19 within the canopy 22 for protection. A processor 108 (see FIG. 1b) is in communication with the detector 104, with the transducer 32 via a port 110, with the controller 34 via port 112, and with non-volatile memory 114. Furthermore, the processor 108 is in communication with the transmitter 102 or with a controller, not shown, controlling provision of power to the transmitter. The processor 108 and the non-volatile memory 114 are disposed, for example, in the control unit 24, enabling independent operation "on site". Optionally, the processor 108 is in communication with a second processor, not shown, located, for example, in an airport terminal enabling a gate-operator located in the terminal to instruct the processor 108, for example, to start the height adjustment. Further optionally, the non-volatile memory is omitted and data stored therein such as data indicative of aircraft models and data related to doorsill height are provided from a database located in the terminal. Instructions for performing the automated vertical adjustment according to the instant invention are provided as executable commands to the processor or, alternatively, are hardwired. Further optionally, the processor 108 is replaced with a programmable or a non-programmable limit switch.

Figure 2:
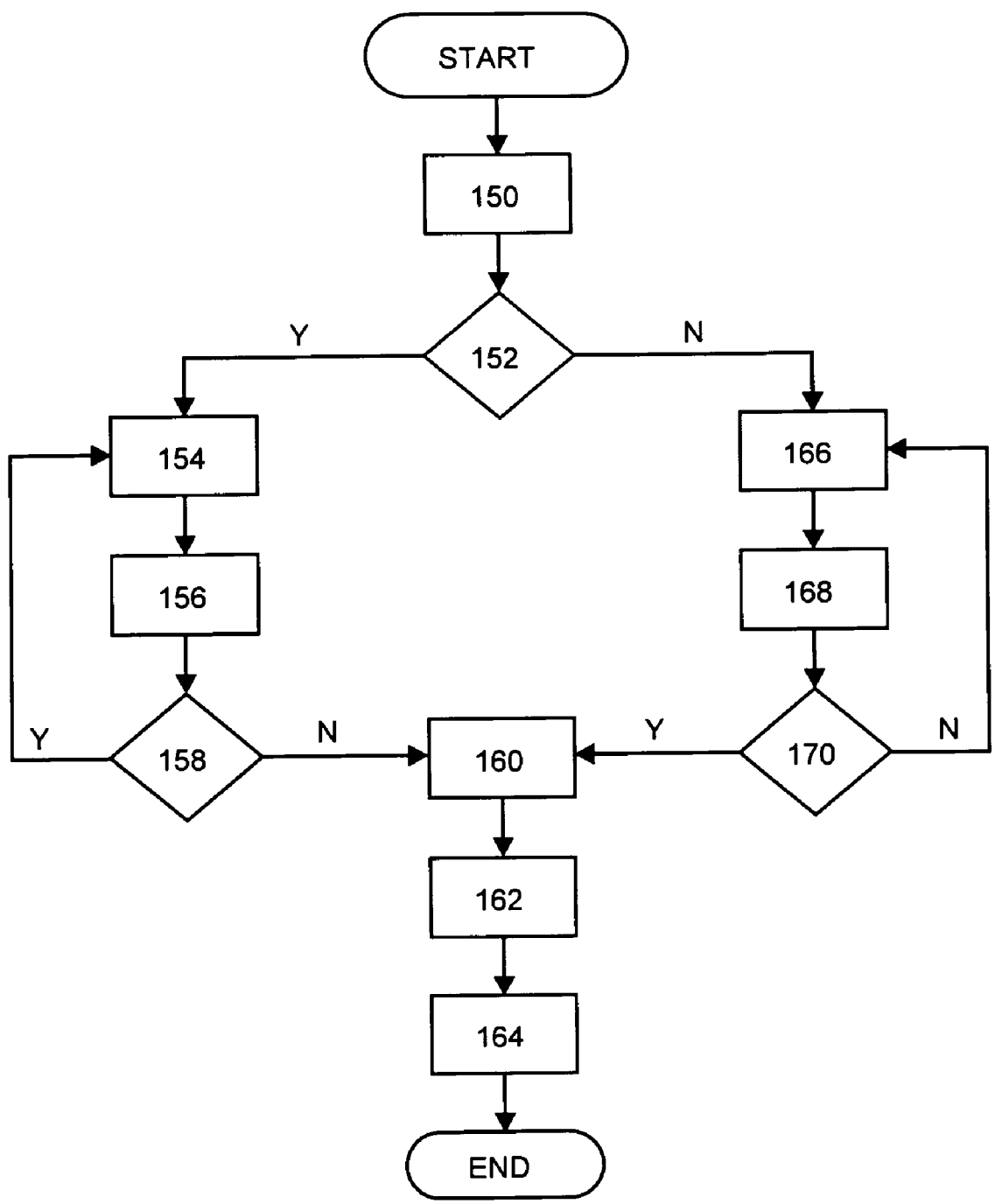
FIG. 2 is a simplified flow diagram of a method for elevationally aligning a passenger loading bridge according to the instant invention.

Referring to FIG. 2, shown is a simplified flow diagram of a method of automated elevational adjustment of a passenger loading bridge 10 according to an embodiment of the instant invention. Final elevational adjustment is, for example, initiated after the passenger loading bridge 10 is moved to a preset position and the aircraft 12 is parked or is soon coming to a complete stop. Upon initiation, a beam of electromagnetic radiation is transmitted substantially horizontally towards the aircraft 12 at block 150. If reflected radiation is sensed at block 152, for instance by the detector 104, then a signal indicative of the detection of a reflection is provided to the processor 108 at block 154, and the processor 108 instructs the controller 34 to lift the passenger loading bridge 10 at block 156. The passenger loading bridge 10 is lifted as long as the detector 104 provides a signal indicative of a reflection at decision block 158. A change from detecting reflected radiation to the instance when no radiation is detected indicates that the beam passes above the top of the aircraft's 12 fuselage. Since the lift operation is performed at a relatively slow speed, signal communication between the detector 104, the processor 108, and the controller 34 is sufficiently fast for indicating the instance of the beam being level with the top of the aircraft's 12 fuselage during the lift operation and to stop the lifting process. Alternatively, the passenger loading bridge 10 is lifted in intervals and reflected radiation is detected after each interval with either the intervals being sufficiently small for proper alignment of the floor member 20 with the doorsill 16 or when no reflection is detected after an interval the passenger loading bridge is lowered in smaller intervals until a reflection is detected again. Based on data indicative of a distance B between the top of the aircraft 12 and the doorsill 16, retrieved from memory 114, and the constant vertical distance A between the transmitter 102 and the surface of the floor member 20, the processor 108 determines an elevational adjustment distance C as the difference B-A at block 160, and provides a signal indicative of the elevational adjustment distance to the controller 34 at block 162 for elevationally adjusting the passenger loading bridge 10 accordingly at block 164.

Alternatively, since A is constant in the illustrated embodiment, the elevational adjustment distance C optionally is stored directly for different aircraft models serviced by the passenger loading bridge 10, obviating the step of calculating the difference during each alignment operation.

Preferably, the aircraft model is determined automatically using existing methods of pre-identification known to one skilled in the art or, alternatively, the aircraft model is provided manually, for example, by a gate operator, and a signal indicative of the aircraft model is provided to the processor 108. Preferably, in order to save time the step of identification is performed during approach of the aircraft to the gate.

In the event that no reflected radiation is sensed by the detector 104 at block 152, then a signal indicative of no detection of a reflection is provided to the processor 108 at block 166, and at block 168 the processor instructs the controller 34 to lower the passenger loading bridge 10. The passenger loading bridge 10 is lowered as long as the detector 104 provides a signal indicative of no reflection at decision block 170.

Alternatively, the transmitter 102 and the detector 104 are attached to the bottom of floor member 20 for sensing the bottom of the aircraft's 12 fuselage. As is evident, the method shown in FIG. 2 is easily adapted for adjusting the passenger loading bridge 10 by detecting the bottom of the fuselage of the aircraft 12. Detecting the bottom the aircraft's 12 fuselage is advantageous for servicing aircraft models having two decks such as Airbus A380 or the front section of a Boeing 747.

Further alternatively, two pairs of transmitters 102 and detectors 104 are provided, for detecting the top and the bottom of the aircraft's 12 fuselage, respectively. This arrangement supports, for example, adjusting the passenger loading bridge by only lifting the same when the bottom detector detects no reflected radiation and by only lowering the same when the top detector detects no reflected radiation. Thus, obviating the need to, for example, lift the bridge first until no reflected radiation is detected and then lower the bridge to the appropriate height, reducing the time that is needed to adjust the bridge. Another advantage of employing two pairs of transmitters and detectors is redundancy, i.e. the automatic elevational adjustment is still fully operable in case of a malfunction of a transmitter or detector.

The system 100 supports automated final elevational adjustment of a passenger loading bridge. The simple principle of detecting the instance of a reflection enables simple processing and, therefore, a quick response. Furthermore, by detecting the top or bottom of the aircraft above or below the door the system 100 is highly accurate for final vertical adjustments. Due to its simplicity, the system 100 is also implementable into existing automated passenger bridge alignment systems as a retrofit for providing automated final vertical adjustment.

Optionally, other characteristics than the top or bottom of the aircraft's fuselage such as top or bottom of an aircraft's wing or bottom of an aircraft's engine nacelle are detected for the vertical adjustment. However, vertical adjustment using characteristics other than the top or bottom of the aircraft's fuselage at approximately a same location as the door is substantially less accurate.

Figure 3:
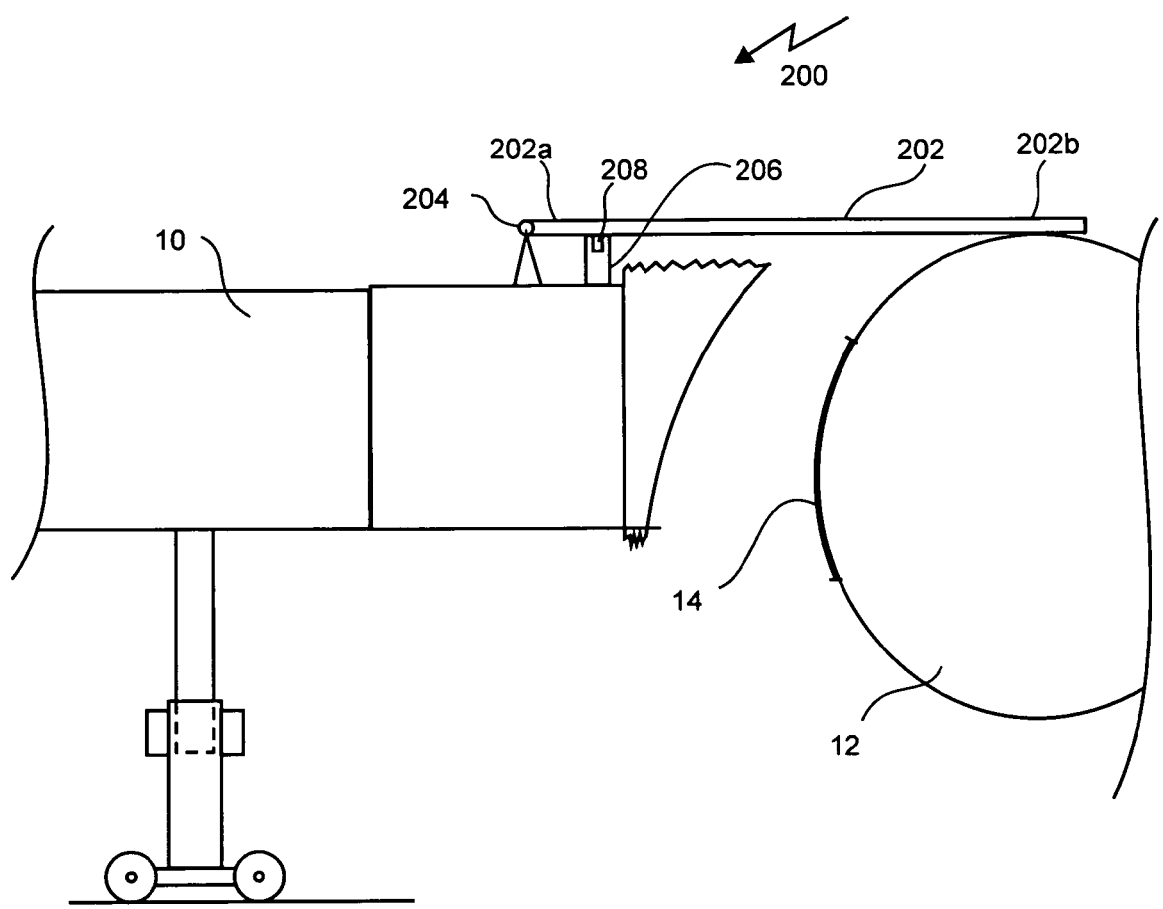
FIG. 3 illustrates a schematic side view of a second embodiment of the system according to the instant invention.

Referring to FIG. 3, a schematic block diagram of a second embodiment 200 of a system for automated vertical adjustment is shown. In the embodiment 200, the transmitter 102 and the detector 104 are replaced by an elongated body 202 mounted at a mounting end 202b thereof via pivot 204 to a surface of the cabin 18, and an indicator 208. The elongated body 202 is supported by support 206 in a substantially horizontal orientation, such that an indicating end 202b of the elongated body is positionable close to or in contact with the upper surface of aircraft 12. The indicator 208 indicates instances when the elongated body 202 is oriented other than horizontal, such as for instance when the indicating end 202b contacts the upper surface of aircraft 12 and comes to rest thereon. This is realized, for example, by integrating a switch into the support 206. In operation, the elongated body 202 is first positioned above the top of the aircraft's 12 fuselage. Then the passenger loading bridge 10 is lowered until the indicating end 202b of elongated body 202 touches the top of the aircraft's fuselage, thereby activating the switch, which in return provides a signal to the processor 108 indicating the elevational position of the top of the aircraft's 12 fuselage. Automated elevational adjustment using system 200 is performed according to the steps indicated by blocks 166 to 170 and 160 to 164. Optionally, the pivot 204 and the support 206 are mounted on a rotatable platform in order to move the elongated body 202 in a "parking position" facing away from an aircraft when not in use avoiding a collision with the same. Prior to elevational adjustment, the lever is moved over the upper surface of the aircraft.

Figure 4:
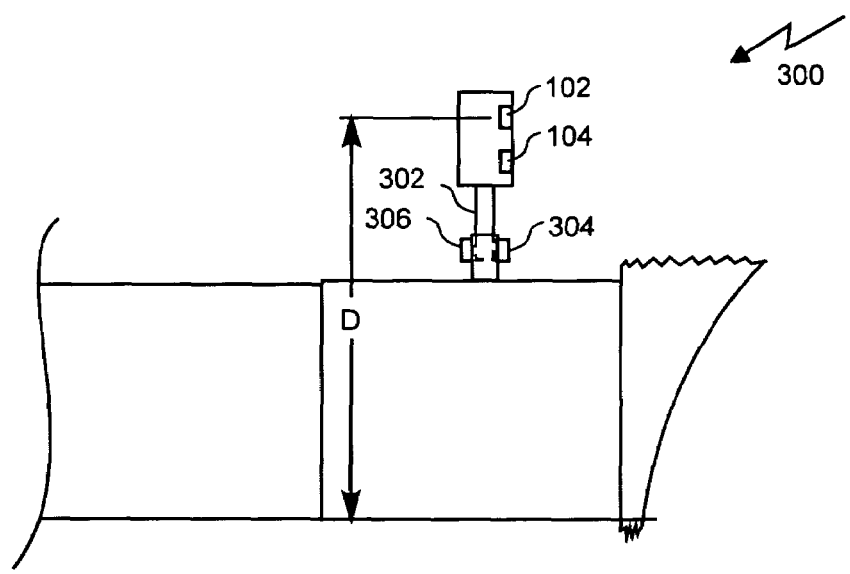
FIG. 4 illustrates a schematic side view of a third embodiment of the system according to the instant invention; and, FIG. 5 illustrates a schematic side view of a fourth embodiment of the system according to the instant invention.

Referring to FIG. 4, a schematic block diagram of a third embodiment 300 of a system for automated elevational adjustment is shown. In the embodiment 300 the transmitter 102 and the detector 104, collectively referred to as the sensor, are mounted to the top, or to the bottom, of the cabin 18 via a vertically oriented telescopic support 302. Telescopic movement is controlled via controller 304 and height D above the floor member 20 of the transmitter 102 is measured using transducer 306. Operation of the system 300 is principally the same as the one shown in FIG. 2, replacing the vertical movement of the passenger loading bridge 10 for detecting the top of the aircraft's fuselage with vertically moving the transmitter 102 and the detector 104 via the telescopic support 302. The adjustment difference C is then easily determined based on the distances D and B. While the system 300 is more complex than system 100 it has the advantage that the passenger loading bridge 10 is not moved prior determination of the adjustment distance. Furthermore, this system also allows elevational adjustment during unloading and loading of an aircraft. For example, after the passenger loading bridge is adjusted and during unloading the transmitter mounted to the top of the cabin is moved into a position close to the top of the aircraft where no reflected radiation is detected. As the height of the aircraft increases during unloading, the beam comes in contact with the aircraft's fuselage and reflected radiation is detected. The passenger loading bridge is then adjusted until no reflected radiation is detected. Preferably, this process is performed in predetermined time intervals.

Optionally, the transmitter 102 and the detector 104 are replaced by an imager such as a one dimensional CCD array for detecting the top or the bottom of the aircraft's fuselage as a substantially sudden change in light intensity or color between the aircraft and background. Thus signal processing is limited to the detection of the position of the sudden change, i.e. image processing is substantially less compared to normal image processing methods. Further optionally, an imaged section of the aircraft's fuselage is illuminated providing sufficient contrast at night between the illuminated fuselage and dark background. Employment of an imager also enables elevational adjustment during unloading and loading of the aircraft.

Figure 5:
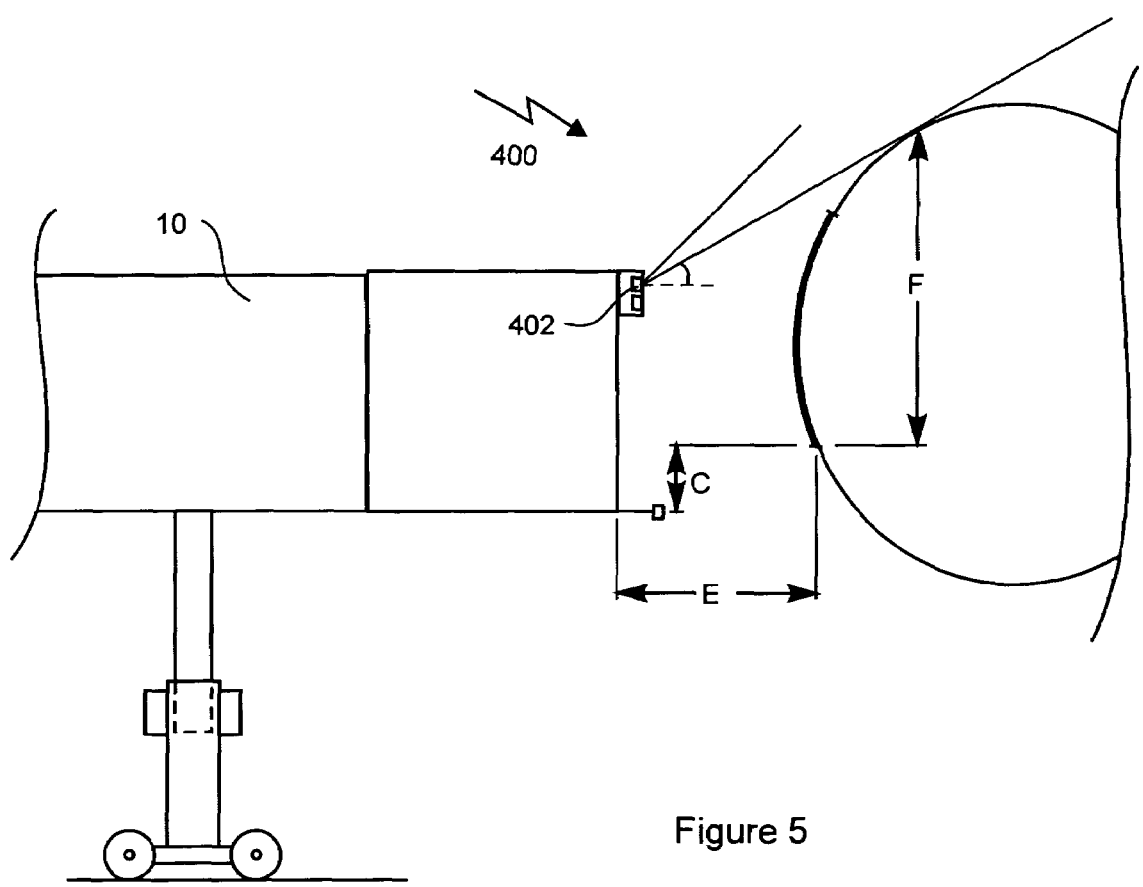

Referring to FIG. 5, yet another embodiment 400 of a system for automated elevational adjustment is shown. Using transmitter 402 a beam of electromagnetic radiation is emitted at different angles $\alpha$ to the horizontal until a beam interacts with the fuselage of the aircraft and a reflection is detected. Changing the orientation of the beam is realized using, for example, a rotating mirror or, by rotating the transmitter 402. If the beam is oriented at an angle to the horizontal, it intersects with the fuselage, which has usually a curved surface, at a position other than the top, as indicated in FIG. 5. The adjustment distance C between the floor member surface and the doorsill is then determined based on distance E between the cabin and the aircraft, the angle $\alpha$, and aircraft model specific data relating the angle $\alpha$ and the distance E to distance F between the point of intersection and the doorsill. The distance E is measured using, for example, a laser range finder (LFR), which is well known in the art.

In all of the above embodiments including an electromagnetic radiation transmitter and detector pair, at least one transmitter element is provided for transmitting electromagnetic radiation having a range of wavelengths selected from a known portion of the electromagnetic spectrum, and at least one detector element is provided for sensing at least an intensity of the electromagnetic radiation having the range of wavelengths selected from the known portion of the electromagnetic spectrum after reflection from the upper surface of the aircraft. Optionally, the range of wavelengths is selected from one of the infrared, ultraviolet and visible portions of the electromagnetic spectrum. Further optionally, the at least one transmitter element is a laser light source.

Figure 6:
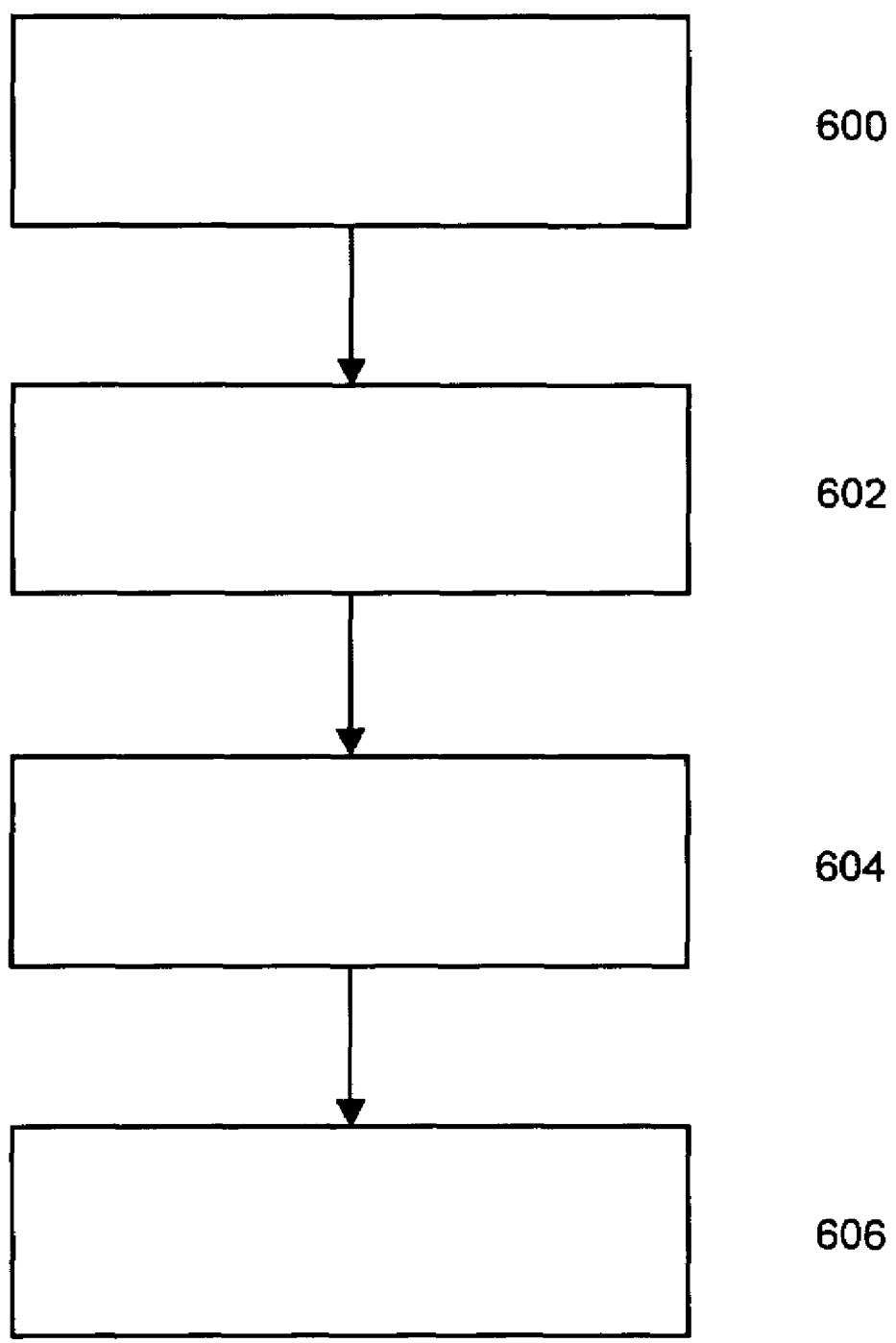
FIG. 6 is a simplified flow diagram of a method for elevationally aligning a movable bridge with a doorway of an aircraft according to an embodiment of the instant invention.

Referring now to FIG. 6, shown is a simplified flow diagram of a method for elevationally aligning a movable bridge with a doorway of an aircraft according to the instant invention. At step 600, a sensor is used to launch electromagnetic radiation along a first optical path and in a direction toward the aircraft. At step 602 a first intensity of the electromagnetic radiation is sensed after being reflected from a known surface of the aircraft along the first optical path. At step 604 the sensor is adjusted so as to emit electromagnetic radiation along other optical paths that are increasingly spaced apart from the first optical path, until the sensed intensity of electromagnetic radiation being reflected from the known surface of the aircraft along one of the other optical paths changes by a predetermined amount that is indicative of the sensor sensing an elevational limit of the known surface of the aircraft. At step 606 the elevational position of an aircraft engaging portion of the movable bridge is adjusted based upon the indicated elevational limit of the known surface of the aircraft and based upon a known elevational relationship between the elevational limit of the known surface of the aircraft and the doorway of the aircraft. At step 602, the first intensity of the electromagnetic radiation may be approximately zero, in which case it is known that the electromagnetic radiation is not impinging upon the known surface of the aircraft. Accordingly, the change in the sensed intensity of the electromagnetic radiation is indicative of the electromagnetic radiation beginning to impinge upon the known surface of the aircraft. Alternatively, at step 602, the first intensity of the electromagnetic radiation may be substantially greater than zero, in which case it is known that the electromagnetic radiation is impinging upon the known surface of the aircraft. In this latter case, the change in the sensed intensity of the electromagnetic radiation is indicative of the sensor sensing past the elevational limit of the known surface of the aircraft, such that the electromagnetic radiation no longer impinges upon the known surface of the aircraft.

Figure 7:
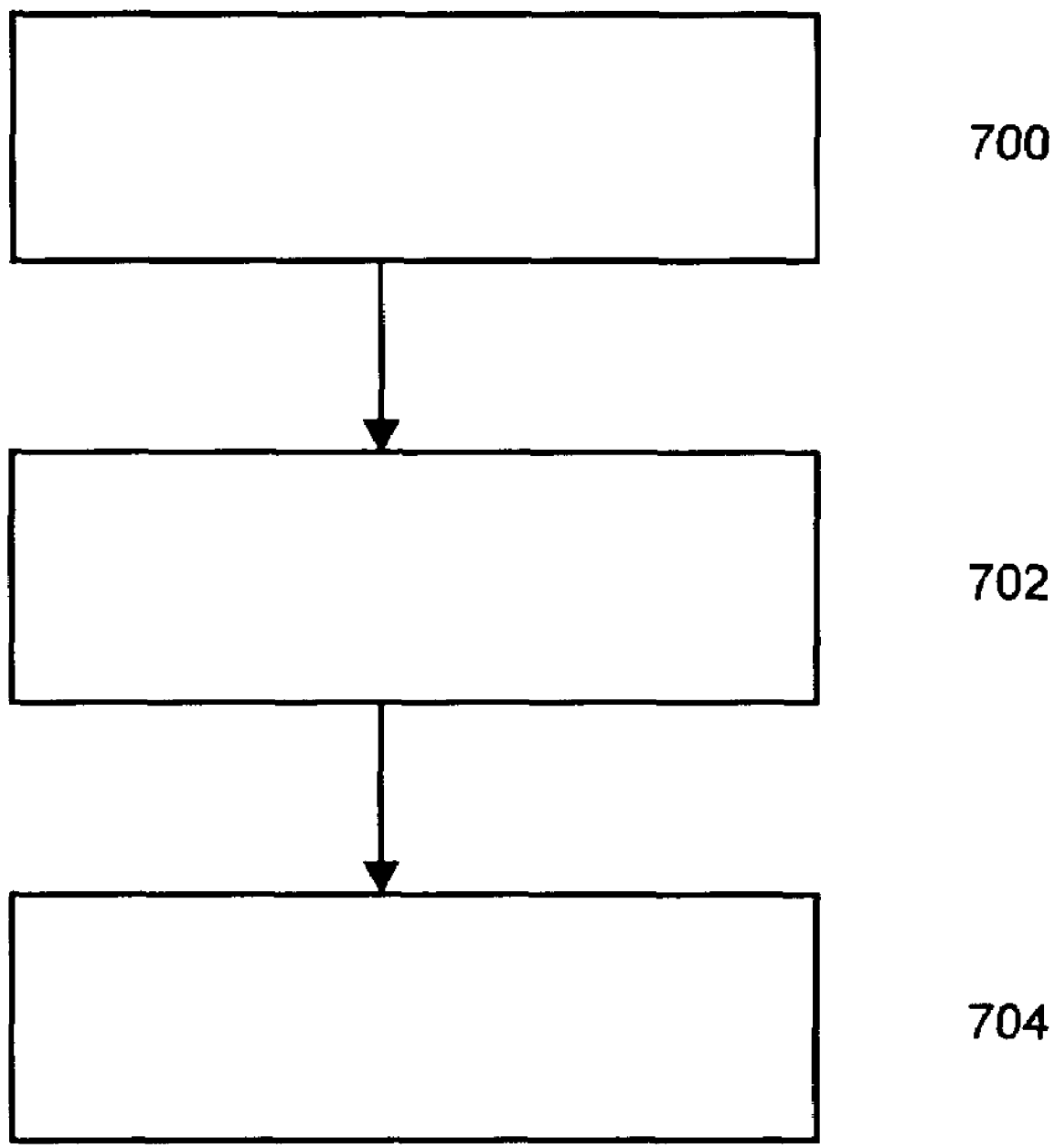
FIG. 7 is a simplified flow diagram of another method for elevationally aligning a movable bridge with a doorway of an aircraft according to an embodiment of the instant invention.

Referring now to FIG. 7, shown is a simplified flow diagram of another method for elevationally aligning a movable bridge with a doorway of an aircraft according to the instant invention. At step 700, an aircraft engaging portion of the movable bridge is aligned with the doorway of the aircraft in a direction along the length of the aircraft and such that the sensor is disposed elevationally above the upper surface of the aircraft. At step 702, the sensor is moved in a generally downward direction toward an upper surface of the aircraft. At step 704, an indication is sensed that is indicative of the sensor being at approximately at a same elevational position as the upper surface of the aircraft.

Figure 8:
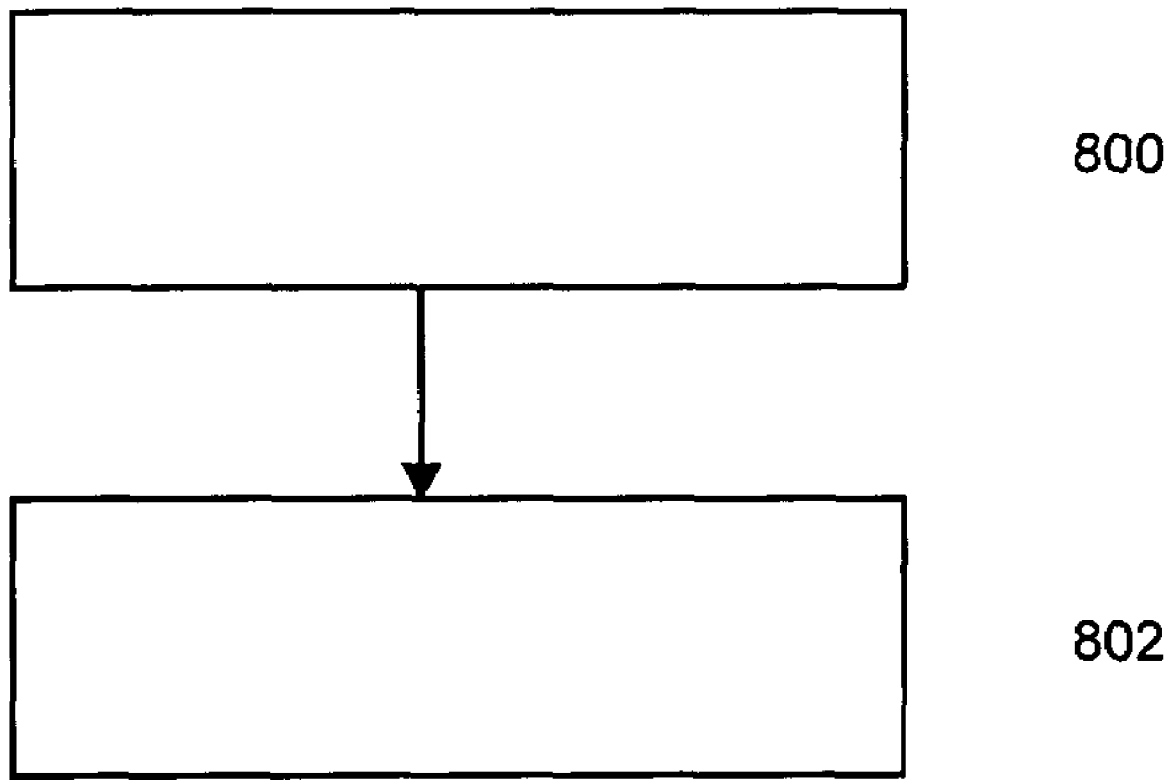
FIG. 8 is a simplified flow diagram of yet another method for elevationally aligning a movable bridge with a doorway of an aircraft according to an embodiment of the instant invention.

Referring now to FIG. 8, shown is a simplified flow diagram of yet another method for elevationally aligning a movable bridge with a doorway of an aircraft according to the instant invention. At step 800, a sensor is used to sense a property relating to each one of a plurality of different elevational locations within a vertical plane that is normal to a length of the aircraft, the vertical plane passing through the doorway of the aircraft to which the moveable bridge is to be elevationally aligned, and at least some of the plurality of different elevational locations being disposed outside a known surface boundary of the aircraft. At step 802 a variation in the sensed property is detected between two elevational locations of the plurality of different elevational locations, the variation being indicative of an elevational position of the known surface boundary of the aircraft. Preferably, the property that is sensed at step 800 is an intensity of electromagnetic radiation being reflected from the elevational location.

Figure 9A:
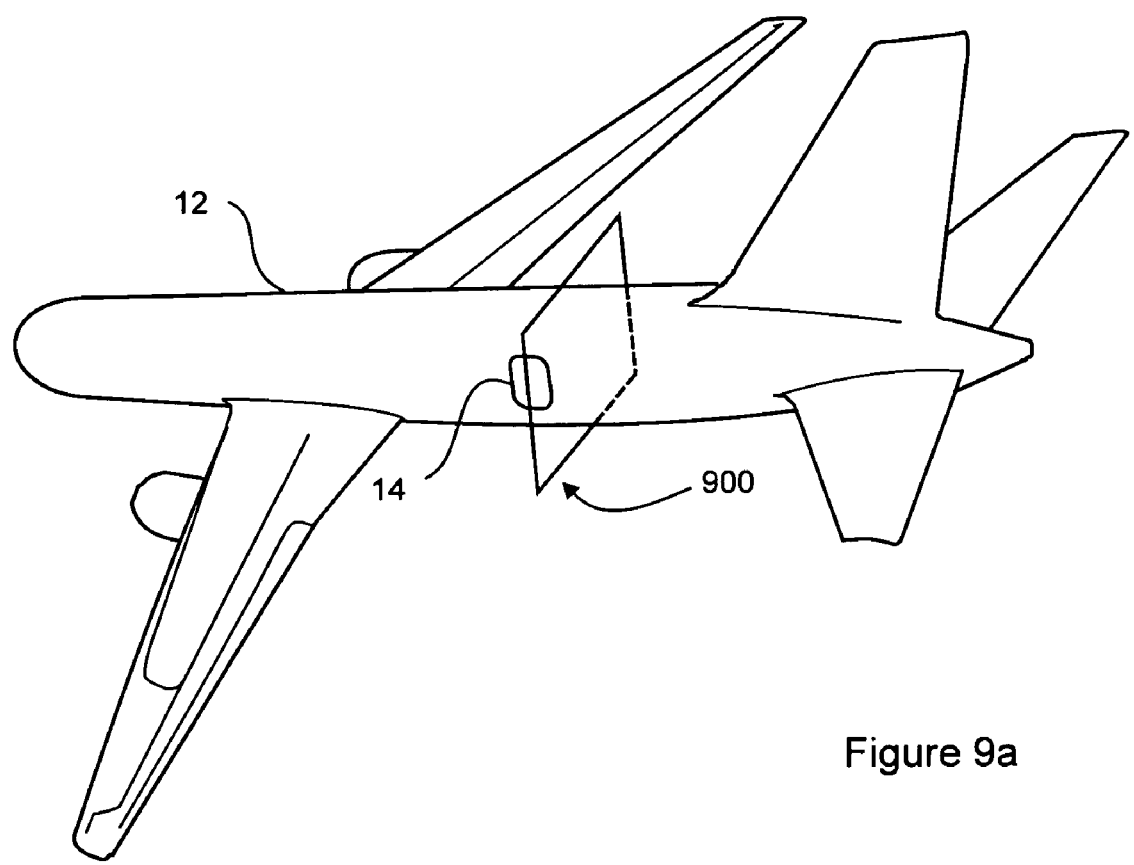
FIG. 9a is an illustrative view of an aircraft 12 having a doorway 14 and showing the position of a vertical plane 900 with respect to the doorway 14; and, FIG. 9b is an enlarged partial side view of the aircraft 12 with the vertical plane 900 coming out of the plane of the paper and passing through the doorway 14.
Figure 9B:
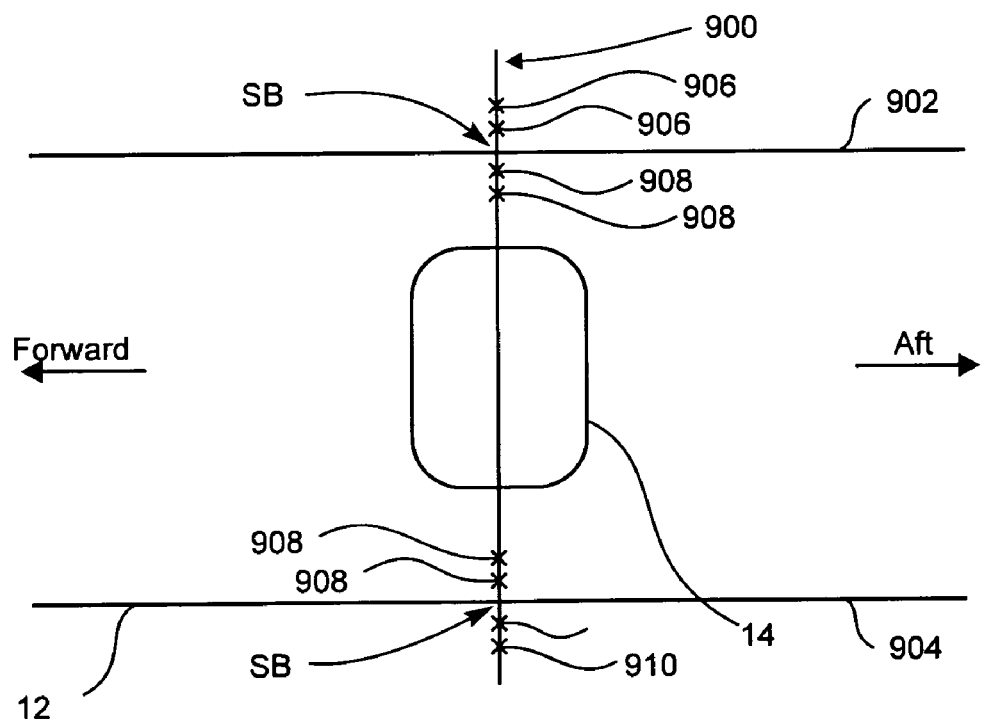

Referring now to FIG. 9*a*, shown is an illustrative view of an aircraft 12 having a doorway 14 and showing the position of a vertical plane 900 with respect to the doorway 14. Referring now to FIG. 9*b*, shown is an enlarged partial side view of the aircraft 12 with the vertical plane 900 coming out of the plane of the paper and passing through the doorway 14. In FIG. 9*b*, the upper surface 902 and lower surface 904 of aircraft 12 are indicated. The point where the vertical plane 900 intersects either the upper surface 902 or lower surface 904 of aircraft 12 is referred to as a known surface boundary, SB, as is indicated at FIG. 9*b*. Points 908 are disposed inside the known surface boundary, whereas points 906 and points 910 are disposed outside the known surface boundary.

According to at least some of the embodiments of the instant invention, the relationship between an elevational limit of a known surface and the doorway of the aircraft has no relationship to an easily identifiable real world, or human intelligible, parameter. For instance, the elevational limit of a known surface may not correspond to a point along the surface having the maximum, or alternatively the minimum, elevational position. Provided that the passenger loading bridge is aligned with the doorway and is always positioned at a same known distance from the surface of the aircraft, then the sensor will always sense a change in the intensity of reflected electromagnetic radiation while moving past a same point along the surface of the aircraft. Since the position of this point is reproducible and may be calibrated for different distances or different models of aircraft, then the position of this point is considered to be a "virtual elevational limit" of the known surface of the aircraft. The calibration step may be performed after installation, for example a bridge operator performs the calibration step during the first elevational alignment operation for each model of aircraft. Alternatively, calibration parameters are preprogrammed. Of course, the use of a "virtual elevational limit" is envisaged with respect to the methods and apparatus that have been described supra.

Numerous other embodiments of the invention will be apparent to persons skilled in the art without departing from the spirit and scope of the invention as defined in the appended claims.

What is claimed is:

1. A method for elevationally aligning a movable bridge with a doorway of an aircraft, comprising:
   providing a sensor disposed on the movable bridge, the sensor mounted to a surface of the movable bridge via a telescopic support;
   using the sensor, launching electromagnetic radiation along a first optical path and in a direction toward the aircraft;
   sensing a first intensity of the electromagnetic radiation being reflected from a known surface of the aircraft along the first optical path;
   adjusting a length of the telescopic support for varying an elevational position of the sensor, so as to emit electromagnetic radiation along other optical paths that are increasingly vertically spaced apart from the first optical path, until the sensed intensity of electromagnetic radiation being reflected from the known surface of the aircraft along one of the other optical paths changes by a predetermined amount that is indicative of the sensor sensing an elevational limit of the known surface of the aircraft; and,
   adjusting an elevational position of an aircraft engaging portion of the movable bridge based upon the indicated elevational limit of the known surface of the aircraft and based upon a known elevational relationship between the elevational limit of the known surface of the aircraft and the doorway of the aircraft.

2. A method for elevationally aligning a movable bridge with a doorway of an aircraft according to claim 1, comprising providing the sensor at a location proximate the aircraft engaging portion of the movable bridge.

3. A method for elevationally aligning a movable bridge with a doorway of an aircraft according to claim 1, wherein adjusting the sensor is performed without moving the moveable bridge.

4. A method for elevationally aligning a movable bridge with a doorway of an aircraft according to claim 1, comprising:
identifying a model of the aircraft; and,
retrieving from memory data that is indicative of the known elevational relationship between the elevational limit of the known surface of the aircraft and the doorway of the aircraft for the identified model of the aircraft.

5. A method for elevationally aligning a movable bridge with a doorway of an aircraft according to claim 1, wherein adjusting the sensor and adjusting an elevational position of an aircraft engaging portion of the movable bridge are performed by:
adjusting the sensor relative to the moveable bridge so that when the elevational limit of the known surface of the aircraft is sensed, the aircraft engaging portion of the moveable bridge is elevationally aligned with the doorway of the aircraft; and,
adjusting the aircraft engaging portion of the moveable bridge until the elevational limit of the known surface of the aircraft is sensed.

6. A method for elevationally aligning a movable bridge with a doorway of an aircraft according to claim 5, comprising:
identifying a model of the aircraft,
wherein adjusting the sensor relative to the moveable bridge comprises positioning the sensor at a predetermined position relative to the moveable bridge, the predetermined position selected in dependence upon the identified model of the aircraft.

7. A method for elevationally aligning a movable bridge with a doorway of an aircraft according to claim 1, wherein providing a sensor comprises providing at least one transmitter element for transmitting electromagnetic radiation having a range of wavelengths selected from a known portion of the electromagnetic spectrum and further comprises providing at least one detector element for sensing at least an intensity of the electromagnetic radiation having the range of wavelengths selected from the known portion of the electromagnetic spectrum after reflection from the known surface of the aircraft.

8. A method for elevationally aligning a movable bridge with a doorway of an aircraft according to claim 7, comprising aligning the aircraft engaging portion of the movable bridge with the doorway of the aircraft in a direction along the length of the aircraft, and at a known distance from the doorway of the aircraft in a direction transverse to the length of the aircraft.

9. A method for elevationally aligning a movable bridge with a doorway of an aircraft according to claim 1, comprising aligning the aircraft engaging portion of the movable bridge with the doorway of the aircraft in a direction along the length of the aircraft.

10. A method for elevationally aligning a movable bridge with a doorway of an aircraft according to claim 9, wherein adjusting the sensor comprises elevationally displacing the sensor relative to the known surface of the aircraft.

11. A method for elevationally aligning a movable bridge with a doorway of an aircraft according to claim 10, wherein the first intensity is indicative of the sensor being in a facing arrangement with the known surface of the aircraft.

12. A method for elevationally aligning a movable bridge with a doorway of an aircraft according to claim 11, wherein the known surface of the aircraft is an upper surface of the aircraft, and wherein the predetermined amount of change of the sensed intensity is indicative of the sensor being moved from a position that is elevationally below the elevational limit of the upper surface of the aircraft to a position that is elevationally above the elevational limit of the upper surface of the aircraft.

13. A method for elevationally aligning a movable bridge with a doorway of an aircraft according to claim 11, wherein the known surface of the aircraft is a lower surface of the aircraft, and wherein the predetermined amount of change of the sensed intensity is indicative of the sensor being moved from a position that is elevationally above the elevational limit of the lower surface of the aircraft to a position that is elevationally below the elevational limit of the lower surface of the aircraft.

14. A method for elevationally aligning a movable bridge with a doorway of an aircraft according to claim 10, wherein the first intensity is indicative of the sensor not being in a facing arrangement with the known surface of the aircraft.

15. A method for elevationally aligning a movable bridge with a doorway of an aircraft according to claim 14, wherein the known surface of the aircraft is an upper surface of the aircraft, and wherein the predetermined amount of change of the sensed intensity is indicative of the sensor being moved from a position that is elevationally above the elevational limit of the upper surface of the aircraft to a position that is elevationally below the elevational limit of the upper surface of the aircraft.

16. A method for elevationally aligning a movable bridge with a doorway of an aircraft according to claim 14, wherein the known surface of the aircraft is a lower surface of the aircraft, and wherein the predetermined amount of change of the sensed intensity is indicative of the sensor being moved from a position that is elevationally below the elevational limit of the lower surface of the aircraft to a position that is elevationally above the elevational limit of the lower surface of the aircraft.

17. A method for elevationally aligning a movable bridge with a doorway of an aircraft, comprising:
providing a sensor disposed on the movable bridge, the sensor including a rotatable element for controllably directing electromagnetic radiation at different angles $\alpha$ to the horizontal;
using the sensor, launching electromagnetic radiation along a first optical path and in a direction toward the aircraft;
sensing a first intensity of the electromagnetic radiation being reflected from a known surface of the aircraft along the first optical path;
adjusting the sensor by rotating the rotatable element relative to the movable bridge so as to emit electromagnetic radiation along other optical paths that are increasingly angularly spaced apart from the first optical path, until the sensed intensity of electromagnetic radiation being reflected from the known surface of the aircraft along one of the other optical paths changes by a predetermined amount that is indicative of the sensor sensing an elevational limit of the known surface of the aircraft; and,
adjusting an elevational position of an aircraft engaging portion of the movable bridge based upon the indicated elevational limit of the known surface of the aircraft and based upon a known elevational relationship between the elevational limit of the known surface of the aircraft and the doorway of the aircraft.

18. A method according to claim 17, wherein the sensor comprises a transmitter that is rotatably mounted to the movable bridge, and wherein rotating the rotatable element comprises rotating the transmitter relative to the movable bridge.

19. A method according to claim 17, wherein the sensor comprises a transmitter mounted to the movable bridge and a rotatable mirror in optical communication with the transmitter, and wherein rotating the rotatable element comprises rotating the rotatable mirror relative to the movable bridge.

20. A method for elevationally aligning a movable bridge with a doorway of an aircraft according to claim 17, comprising providing the sensor at a location proximate the aircraft engaging portion of the movable bridge.

21. A method for elevationally aligning a movable bridge with a doorway of an aircraft according to claim 17, comprising:
  identifying a model of the aircraft; and,
    retrieving from memory data that is indicative of the known elevational relationship between the elevational limit of the known surface of the aircraft and the doorway of the aircraft for the identified model of the aircraft.

22. A method for elevationally aligning a movable bridge with a doorway of an aircraft according to claim 17, comprising aligning the aircraft engaging portion of the movable bridge with the doorway of the aircraft in a direction along the length of the aircraft.

23. A method for elevationally aligning a movable bridge with a doorway of an aircraft according to claim 17, wherein adjusting the sensor is performed without moving the moveable bridge.

24. A method for elevationally aligning a movable bridge with a doorway of an aircraft according to claim 17, wherein providing a sensor comprises providing at least one transmitter element for transmitting electromagnetic radiation having a range of wavelengths selected from a known portion of the electromagnetic spectrum and further comprises providing at least one detector element for sensing at least an intensity of the electromagnetic radiation having the range of wavelengths selected from the known portion of the electromagnetic spectrum after reflection from the known surface of the aircraft.

25. A method for elevationally aligning a movable bridge with a doorway of an aircraft according to claim 24, comprising aligning the aircraft engaging portion of the movable bridge with the doorway of the aircraft in a direction along the length of the aircraft, and at a known distance from the doorway of the aircraft in a direction transverse to the length of the aircraft.

26. A method for elevationally aligning a movable bridge with a doorway of an aircraft according to claim 25, wherein adjusting the sensor comprises angularly adjusting an orientation of at least the at least one transmitter element of the sensor relative to the known surface of the aircraft.

* * * * *